United States Patent Office 2,994,585
Patented Aug. 1, 1961

2,994,585
PROCESS FOR EXTRACTING SULPHUR DIOXIDE FROM GASES USING GLYOXAL
Henri G. L. Marcheguet, Amfreville-la-Mi-Voie, and Louis Gandon, Paris, France, assignors to Nobel-Bozel, Paris, France, a company of France
No Drawing. Filed Jan. 21, 1960, Ser. No. 3,732
Claims priority, application France Feb. 2, 1959
9 Claims. (Cl. 23—178)

It is known that it is possible to extract sulphur dioxide from gases which contain it by absorption in solvents (water or organic liquids), or by adsorption on active carbon and similar substances or by combination with reagents forming sulphurous complexes (aromatic amines, organic bases, mineral or organic salts).

All these processes present great practical difficulties. The efficiency of extraction of sulphur dioxide from gases which contain it is generaly low, especially if the gases have a weak sulphur dioxide content; on the other hand, the regeneration of sulphur dioxide from solutions and from adsorbent masses consumes great quantities of heat. In addition, in the case of solvents, the most commonly used of which is water, the solubility of sulphur dioxide is low; besides, the solvents or absorbents, which are generally volatile, are in part entrained with the sulphur dioxide recovered which, owing to this, is impure. There is, on the other hand, progressive oxidation into sulphuric acid of the sulphur dioxide retained in the solvents, absorbents or adsorbents, which gives rise to losses and to a rapid decrease of the absorptive or adsorptive capacity. Finally, if the sulphur dioxide is to be extracted from a gas which contains other acids (for example $CO_2$, $HCl$, or $SO_3$), these processes become very delicate and complicated.

It is an object of the present invention to provide a process which leads to the elimination of all these disadvantages.

According to the invention gas containing sulphur dioxide is brought into contact with a solution of glyoxal at a temperature lower than 50° C., preferably, in practice at a temperature of from 15° to 30° C., so as to retain the sulphur dioxide in the form of a compound with the glyoxal, and then the solution is heated at a temperature higher than 50° C., preferably from 65° to 75° C., in order to liberate the sulphur dioxide in the practically pure state.

In the specification of our co-pending application Serial No. 847,862, filed October 2, 1959, it has already been assumed that the glyoxal, in aqueous sulphur dioxide medium, formed 1.2-dihydroxy 1.2-ethane disulphonic acid:

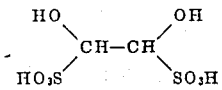

since, in the presence of an alkali, an insoluble product is formed which it is presumed is a bisulphite compound of glyoxal.

In the present process that is no separation of insoluble compound, but the formation, in solution, of the above mentioned acid must be admitted, since it has been found on the one hand, that, under certain working conditions, the absorptive capacity of glyoxal solutions is greater than two molecules of $SO_2$ per molecule of glyoxal and that, on the other hand, if such solutions are stirred, there is evolution of $SO_2$ but this evolution always stops, if mechanical degasification is used (for example by violent stirring), at two molecules of $SO_2$ per molecule of glyoxal in solution. Under the same conditions, aquœous solutions of $SO_2$, on the contrary, liberate sulphur dioxide in a continuous manner. This is demonstrated by the following comparative experiment:

1 litre of water, on the one hand, and 1 litre of a solution of glyoxal, containing 226 g. of CHO—CHO, i.e. 3.9 molecule-grams of glyoxal, on the other hand, were saturated with $SO_2$ at a temperature of 25° C. The solutions obtained contained 95 g. of $SO_2$ per litre of water, and 518 g. of $SO_2$, i.e. 8.1 molecule-grams, per litre of solution of glyoxal, respectively.

These two solutions were then subjected to violent stirring, at 25° C., during increasing time intervals. The $SO_2$ contents remaining, expressed in grams of $SO_2$ per litre of solvent (water or solution of glyoxal at 226 g. per litre), were as follows:

| Grams of $SO_2$ per litre of solvent remaining after stirring for | 0 hour | ¼ hour | 1 hour | 2½ hours |
|---|---|---|---|---|
| Water | 95 | 44 | 24 | 16 |
| Glyoxal solution | 518 | 509 | 499 | 499 |
| Which expressed in molecule-grams of $SO_2$ per litre: Glyoxal solution (3.9 mol-g. of glyoxal) | 8.1 | 8.0 | 7.8 | 7.8 |

The proportion of $SO_2$ retained in a stable manner at 25° C. by the glyoxal solution was therefore 2 molecules of $SO_2$ per molecule of glyoxal contained in the solution, whilst the aqueous solution, free of glyoxal, evolved $SO_2$ in a continuous manner and practically without limit. The proportion of 2 molecules of $SO_2$ per molecule of glyoxal will therefore be considered hereafter as corresponding to the "theoretical capacity of absorption" of glyoxal solutions. Nevertheless, it is to be understood that the invention is not connected with these hypotheses or attempts to explain the chemical process of the reaction. It is to be noted, in particular, that the theoretical principle enunciated above manifests itself in a very variable manner when the process forming the object of the invention is reduced to practice, since, in practice, other factors intervene simultaneously. It has been found in particular that at temperatures above the range 25°–30° C., the "theoretical capacity of absorption" is easily attained or slightly exceeded with aqueous solutions of glyoxal of about 20% by weight; that, under the same conditions, more dilute solutions of glyoxal have a real absorption capacity which is clearly greater than the theoretical capacity of absorption (which is due probably to the capacity of absorption of the water which is added to that of the glyoxal of the solution); that solutions of glyoxal of a concentration greater than 20% have, under the same conditions, a real capacity of absorption lower than the theoretical capacity of absorption. At temperatures above the range 25°–30° C., the capacity of absorption of all these solutions decreases but, in every case, the solutions of glyoxal always have, with respect to $SO_2$, a capacity of absorption which is much greater than that of water, the usual absorbent for $SO_2$.

The following table will facilitate an understanding of these points:

| Temperature, °C. | $SO_2$ 100% absorbed in g. per kg. of solvent (water or glyoxal solution) | | | | $SO_2$ absorbed expressed in molecules of $SO_2$ per molecule of glyoxal, for solutions of glyoxal containing the following percentages by weight of glyoxal | | | Ratio of the absorption of glyoxal solutions to that of water, for solutions of glyoxal containing the following percentages by weight of glyoxal | | |
|---|---|---|---|---|---|---|---|---|---|---|
| | Water | Solutions of glyoxal containing the following percentages by weight of glyoxal | | | | | | | | |
| | | 10% | 20% | 30% | 10% | 20% | 30% | 10% | 20% | 30% |
| 16 | 135 | 310 | 450 | 382 | 2.8 | 2.02 | 1.16 | 2.3 | 3.3 | 2.8 |
| 25 | 94 | 293 | 440 | 376 | 2.7 | 2.0 | 1.14 | 3.1 | 4.7 | 4.0 |
| 40 | 54 | 244 | 364 | 323 | 2.2 | 1.65 | 0.98 | 4.5 | 6.7 | 6.0 |

The process according to the invention aims above all at the extraction of sulphur dioxide from gases which most frequently, in practice, are gases which contain from 6 to 20% of $SO_2$ by volume. It has been found that with regard to the $SO_2$ contained in these industrial gases, the capacity of absorption of a 20% glyoxal solution at 18° C. is of the order of 1.7 molecule-grams of $SO_2$ per molecule-gram of glyoxal (thus less than the "theoretical capacity of absorption" observed with gases with a more concentrated $SO_2$ content, which leads to the supposition that the reaction already mentioned of $SO_2$ with glyoxal is a reversible reaction, the yield of which is a function of the $SO_2$ concentration of the gas to be subjected to extraction); the practical coefficient of absorption of glyoxal solutions with respect to water is however much greater in the case of these dilute gases than in the case of gases with a high concentration of $SO_2$. For example, for a mixture of air and sulphur dioxide, containing 8% by volume of $SO_2$, it has been found that the extreme absorptions, at 18° C., in grams of $SO_2$ per litre of absorbent, were as follows:

20% by weights solution of glyoxal _____ 420 g. $SO_2$ (i.e. about 1.7 mol $SO_2$ per mol of CHO—CHO).

Water _____ 10 g. $SO_2$.

Thus:
Ratio of absorption of the glyoxal solution to that of water _____ About 42.

For carrying out the process according to the invention there is used a solution, preferably an aqueous solution, of glyoxal, having a concentration between 1 and 60% by weight of glyoxal, the optimum concentrations being from 10 to 30%, preferably 20%.

The sulphurous gas to be extracted may have any $SO_2$ content whatsoever, very weak, very strong or medium. The sulphur dioxide may be present in this gas in admixture with any one or more other gases, such as air, carbon dioxide, hydrogen chloride, sulphur trioxide and hydrocarbons.

The sulphurous gas is introduced into the glyoxal solution, the latter being brought to and maintained at a temperature in principle as low as possible. In practice it is preferred to employ a temperature of from 15° to 30° C. Cooling is necessary, so that this temperature is not exceeded, since the reaction of absorbing $SO_2$ by glyoxal is an exothermic one.

The sulphur dioxide is subsequently regenerated by heating to a temperature above 50° C., preferably to a temperature of from 65° to 75° C. There is then recovered practically pure sulphur dioxide. There may be advantage, with the object of increasing the speed of production, in not completely exhausting the $SO_2$ from the glyoxal solution, but in allowing a small proportion to remain after each operation of regenerating the $SO_2$. This manner of operation does not in any way impede the perfect working of the operations.

The process according to the invention may be carried out continuously.

The process forming the object of the invention provides a considerable technical advance, since it combines the following advantages:

The possibility of obtaining sulphur dioxide, in a very simple and very economical manner, by means of a practically quantitative extraction from gases which contain it, these gases having as low an $SO_2$ content as desired.

The absorbent utilised, namely glyoxal, is not entrained in the form of vapour, even in the state of traces, by the recovered sulphur dioxide, the vapour pressure of the glyoxal hydrate being practically nil at 80° C.; as a result there are no losses of glyoxal and practically pure sulphur dioxide is obtained automatically.

It is possible to extract selectively sulphur dioxide from a gaseous mixture containing other acid gases, such as $CO_2$, HCl and $SO_3$; in fact these gases are without action on glyoxal which therefore reserves all its absorptive capacity with respect to $SO_2$.

In the course of a series of successive cycles of absorptions and regenerations there is observed a very slow enrichment of the glyoxal solution in sulphuric acid, but this acid is without action on the glyoxal; it does not influence the rate of absorption of $SO_2$. Moreover, the sulphuric acid may be removed from time to time by known processes.

For the regeneration of the $SO_2$ absorbed by the glyoxal solutions it is not necessary to heat to boiling point; it suffices to raise the temperature of the solutions above 50° C., preferably to from 65° C. to 75° C.; this is a great practical advantage in comparison with other absorbents. In addition, the absorption of $SO_2$ by glyoxal solutions takes place with evolution of heat, which heat can be recovered in this phase.

There will now be given an illustrative, but by no means limitative, example of the carrying into practice of the process forming the object of the invention:

Example

Into a "Pyrex" column filled with Raschig rings there are introduced 2 litres of a solution of glyoxal containing 226 g. of CHO—CHO per litre, having a density of 1.13. By means of a cooling system the temperature of the solution is brought to about 18° C.

With the temperature maintained substantially constant at 18° C., a current of gas composed of air and sulphur dioxide, in the ratio of 8 volumes of $SO_2$ to 92 volumes of air, is led to the base of the column. This current of gas is passed upwardly through the glyoxal solution at a rate of 10.8 litres per minute, for three hours, which represents a quantity of 426 g. of $SO_2$. The gas escaping at the top of the column is practically free of $SO_2$. Analysis of the solution indicates that 420 g. of $SO_2$ have been absorbed.

In order to regenerate the absorbed $SO_2$, the solution is raised to 70° C. until it is completely freed of $SO_2$; there are thus recovered 420 g. of practically pure sulphur dioxide.

Instead of completely exhausting the glyoxal solution of $SO_2$, there is considerable advantage in practice in stopping the heating at 70° C. at the end of 3 hours.

There are then recovered 360 g. of sulphur dioxide and 60 g. of $SO_2$ remain in the two litres of glyoxal. This solution will serve as the absorbent in the following operation: as described above there is passed through it a gas containing 8% by volume of $SO_2$ at a rate of 9.3 litres per minute, during 3 hours, which represents a quantity of 367 g. of $SO_2$. The solution obtained then contains, after passage of the gas, 422 g. of $SO_2$; the gas escaping at the top of the column is practically free of $SO_2$. The solution is raised to 70° C. for 3 hours, in order to regenerate the $SO_2$, and the operation is continued in this manner, with a series of successive absorption and regeneration operations.

Analyses show that the glyoxal content of the solution does not change and, on the other hand, that there is formed, especially at the start, a small proportion of $H_2SO_4$ which only increases very slowly thereafter. There has been found, for example:

| | Glyoxal in solution, g./l. | $H_2SO_4$ formed, g./l. |
|---|---|---|
| After 10 operations | 226 | 24.4 |
| After 20 operations | 226 | 27.3 |

As will be seen, in this practical example, the proportion of $SO_2$ absorbed in the glyoxal solution is much lower than that corresponding to the "theoretical capacity of absorption" of the glyoxal solution: 0.84 molecule-gram of $SO_2$ per molecule-gram of glyoxal, whilst the theoretical capacity of absorption is 2 molecule-grams of $SO_2$ per molecule-gram of glyoxal. In fact, in practice there will generally be advantage in order to decrease the duration of the absorption operations, to work in this way; nevertheless there is nothing to prevent working in the region of the theoretical rates of absorption; this method of operation also has advantage in certain cases and the invention, of course, includes this method as well as all other modifications which can be imagined.

What we claim is:

1. A process for the extraction of sulphur dioxide from gas which contains it, which comprises contacting such a gas with an aqueous solution of glyoxal, at a temperature below 50° C., so as to retain the sulphur dioxide in the form of a compound with the glyoxal, then heating said solution to a temperature above 50° C. in order to liberate the sulphur dioxide in the practically pure state.

2. The process of claim 1, said aqueous solution of glyoxal having a concentration between 1 and 60% of glyoxal by weight.

3. The process of claim 1, said aqueous solution of glyoxal having a concentration between 10 and 30% of glyoxal by weight.

4. The process of claim 3, said aqueous solution of glyoxal having a concentration of 20% of glyoxal by weight.

5. A process for the extraction of sulphur dioxide from gas which contains it, which comprises passing such a gas through an aqueous solution of glyoxal, with cooling at a temperature of from 15° to 30° C., so as to retain the sulphur dioxide in the form of a compound with the glyoxal, then heating said solution while discontinuing passage of said gas therethrough to a temperature above 50° C. in order to liberate the sulphur dioxide in the practically pure state.

6. The process of claim 1, said heating being effected by a temperature of from 65° to 75° C.

7. The process of claim 1, said heating being carried on to a point such that the glyoxal solution is not completely exhausted of sulphur dioxide.

8. A process for the extraction of sulphur dioxide from gas which contains it, which comprises passing such a gas through an aqueous solution of glyoxal, with cooling, at a temperature of from 15° to 30° C., so as to retain the sulphur dioxide in the form of a compound with the glyoxal, then heating said solution to a temperature of from 65° to 75° C. in order to liberate the sulphur dioxide in the practically pure state.

9. A process for the extraction of sulphur dioxide from gas which contains it, which comprises passing such a gas, through an aqueous solution of glyoxal, with cooling, at a temperature of from 15° to 30° C., so as to retain the sulphur dioxide in the form of a compound with the glyoxal, then heating said solution to a temperature of from 65° to 75° C. in order to liberate the sulphur dioxide in the practically pure state to a point such that the glyoxal solution is not completely exhausted of sulphur dioxide.

References Cited in the file of this patent

UNITED STATES PATENTS 2,676,872    Viard    Apr. 27, 1954